United States Patent [19]

Yamashita et al.

[11] 3,870,754

[45] Mar. 11, 1975

[54] PROCESS FOR THE PREPARATION OF 2,6-NAPHTHALENEDICARBOXYLIC ACID

[75] Inventors: Gentaro Yamashita; Kiyoshi Yamamoto, both of Iwakuni, Japan

[73] Assignee: Teijin Limited, Osaka, Japan

[22] Filed: Aug. 28, 1972

[21] Appl. No.: 284,109

[52] U.S. Cl. .............................................. 260/524 R
[51] Int. Cl. ...................... C07c 63/38, C07c 63/02
[58] Field of Search ..................................... 260/524

[56] References Cited
UNITED STATES PATENTS
2,833,816   5/1958   Saffer et al. ...................... 260/524
FOREIGN PATENTS OR APPLICATIONS
4,536,732   11/1970   Japan ................................. 260/524

Primary Examiner—Lorraine A. Weinberger
Assistant Examiner—Richard D. Kelly
Attorney, Agent, or Firm—Sherman & Shalloway

[57] ABSTRACT

A process for the preparation of 2,6-naphthalenedicarboxylic acid which comprises contacting 2,6-dimethylnaphthalene with molecular oxygen, in acetic acid solvent, in the presence of an oxidation catalyst containing cobalt (Co), manganese (Mn), and bromine (Br), the characteristic features residing in that 1. the mol ratio of 2,6-dimethylnaphthalene/acetic acid in the above reaction system is kept no greater than 1/100, and 2. the contact of 2,6-dimethylnaphthalene with molecular oxygen is effected at a temperature within the range of 160° – 250°C.

5 Claims, No Drawings

PROCESS FOR THE PREPARATION OF 2,6-NAPHTHALENEDICARBOXYLIC ACID

This invention relates to a process for the preparation of 2,6-naphthalenedicarboxylic acid from 2,6-dimethylnaphthalene.

More particularly, the invention relates to a process for the preparation of 2,6-naphthalenedicarbocyclic acid through catalytic oxidation of 2,6-dimethylnaphthalene with molecular oxygen, in the presence of a catalyst system comprising cobalt, manganese, and bromine, in acetic acid serving as the solvent.

Naphthalenedicarboxylic acids are a group of compounds useful as the intermediates leading to various industrial chemicals, polyesters, dyestuffs, and the like.

Because of the polyesters synthesized from 2,6-naphthalenedicarboxylic acid and ethylene glycol exhibit excellent heat resistance and mechanical properties as compared with polyethylene terephthalate, shaped articles of such polyesters, such as films, fibers, and the like, are of recent commercial interest.

Synthesis of naphthalene mono- or di-carboxylic acids through oxidation of mono- or di-methylnaphthalene using dichromate as the oxidant. is known. This method, however, is industrially disadvantageous because it requires the use of a special and expensive oxidant.

Various proposals have been made concerning the preparation of aromatic carboxylic acids by oxidation of aromatic compounds containing aliphatic substituents, using molecualr oxygen. For instance, it has been proposed to use a catalyst system composed of a heavy metal and bromine for the preparation of aromatic carboxylic acids (see U.S. Pat No. 2,833,816). Such a conventional method employing a heavy metal-bromine catalyst system achieves satisfactory results in the preparation of benzenecarboxylic acids such as benzoic, terephthalic, and isophthalic acids. However, when the method is applied directly to the preparation of naphthalenedicarboxylic acids, it is difficult to obtain the desired products at high yields. Furthermore, the resulting carboxylic acids tend to be colored yellowish brown to dark brown.

Normally an alkyl group linked with a naphthalene ring is oxidized with greater difficulty than an alkyl group linked with a benzene ring. The naphthalene ring itself is, on the other hand, oxidized and cleft more easily than the benzene ring. Therefore, attempts to oxidize dimethylnaphthalene using known catalysts suitable for the oxidation of alkylbenzenes under the conditions of conventional practice failed to produce satisfactorily naphthalenedicarboxylic acid, because of insufficient oxidation of the methyl groups, excessive cleavage of the naphthalene ring, or the objectionable coloring of the product. Particularly with 2,6-dimethylnaphthalene, the attempts to oxidize the two methyl groups into carboxyl groups without destroying the naphthalene ring met greater difficulties compared with the oxidation of other dimethylnaphthalene isomers.

The oxidation reactions of mono- and di-methylnaphthalenes with molecular oxygen were studied, and it was discovered that when the following three, (i.e., an acetic acid-soluble cobalt compound, an acetic acid-soluble manganese compound, and bromine or a bromine compound), are used as the catalyst at specific quantitative ratios to the mono- and di-methylnaphthalenes to be oxidized, and when the reaction system is contacted with molecular oxygen at temperatures ranging from 70 - 170°C., naphthalene carboxylic acids can be obtained at relatively high yields. This method is the subject of co-pending application Serial No. 114,386.

While the above-mentioned co-pending application concerns oxidation of mono-and di-methylnaphthalenes in general, we further discovered, (in the course of pursuing our studies on the preparation of 2,6-naphthalenedicarboxylic acid through oxidation of 2,6-dimethylnaphthalene with molecular oxygen), that 2,6-naphthalenedicarboxylic acid can be obtained at extremely high yields in accordance with the process of this invention.

Accordingly, the main object of the invention is to provide a process for the preparation of 2,6-naphthalenedicarboxylic acid at high yields, through oxidation of 2,6-dimethylnaphthalene with molecular oxygen.

A further object of the invention is to provide a process for the preparation of 2,6-naphthalenedicarboxylic acid of high purity, in which the formation of ring-cleavage oxidation by-products of 2,6-dimethylnaphthalene such as trimellitic acid is very low, and the products contain only extremely minor amounts of impurities such as oxidation intermediates, e.g., 6-formyl-2-naphthoic acid.

Still another object of the invention is to provide a process for the continuous preparation of 2,6-naphthalenedicarboxylic acid, whereby high quality 2,6-naphthalenedicarboxylic acid of low impurity content can be obtained continuously at high yields.

Other objects and advantages of the invention will become apparent from the following explanations of the invention.

The foregoing objects are accomplished by the process for the preparation of 2,6-naphthalenedicarboxylic acid wherein 2,6-dimethylnaphthalene is contacted with molecular oxygen in acetic acid solvent, in the presence of an oxidation catalyst comprising cobalt (Co), manganese (Mn), and bromine (Br), the characteristic features being:

(1) the mol ratio of 2,6-dimethylnaphthalene to acetic acid in the above reaction system does not exceed 1:100, and (2) the 2,6-dimethylnaphthalene is contacted with molecular oxygen at temperatures ranging from 160° to 250°C.

The invention will be explained in further detail below.

Catalyst

The oxidation reaction of the invention is performed in the presence of a catalyst containing the following three components:

a. a cobalt compound (component A)
b. a manganese compound (component B), and
c. bromine or a bromine compound (component C).

Any cobalt, manganese, and bromine compounds can be used as the catalytic components, as long as they are essentially soluble in acetic acid or aqueous solutions thereof, which are used as the solvent in the invention, at temperatures ranging from 160° to 250°C.

More specific examples of the cobalt and manganese compounds (components A and B) include the following: cobalt and manganese salts of aliphatic carboxylic acids of 2 to 4 carbons such as acetic, propionic, butyric, oxalic, and maleic acids; salts of aromatic carboxylic acids such as benzoic, phthalic, isophthalic, terephthalic, naphthalene monocarboxylic, and naphthalene dicarboxylic acid; salts of alicyclic carboxylic acids such as naphthenic acid; and inorganic salts of cobalt and manganese such as hydroxides, oxides, carbonates, basic carbonates, and bromides.

Among the above-mentioned, salts of aliphatic acids and bromides are preferred, the most being cobalt acetate, cobalt bromide, manganese acetate and manganese bromide. Those salts can be used in either the hydrous or anhydrous state with equal effectiveness.

As the catalytic component (C), bromine or a bromine compound is used in accordance with the invention. Examples of useful bromine compounds include hydrogen bromide, metal salts of hydrobromic acid, ammonium bromide, and organic bromine compounds. Among such bromine compounds, those preferred are ammonium bromide ($NH_4Br$), sodium bromide (NaBr), potassium bromide (KBr), cobalt bromide ($CoBr^2$), manganese bromide ($MnBr_2$), bromoacetic acid, benzyl bromide, tetrabromoethane, and bromonaphthalene.

According to this invention, it is advantageous to add the (a) cobalt compound, (b) manganese compound, and (c) bromine or bromine compound as above-mentioned, to the oxidation reaction system of the invention, at such quantitative ratios to provide, respectively, at least 0.02 gram-atom per 100 mols of acetic acid of cobalt (Co), and at least 0.01 gram-atom each, per 100 mols of acetic acid, of manganese (Mn) and bromine (Br), in the reaction system. It is particularly preferred to use at least 0.05 gram-atom of the cobalt (Co) per 100 mols of the acetic acid. While there is no critical upper limit to the quantity of cobalt (Co) in the reaction system, normally no additional advantage is gained when it exceeds 3 gram-atoms per 100 mols of the acetic acid. Thus the generally preferred range is from 0.05 to 2 gram-atoms of the cobalt (Co) per 100 mols of the acetic acid.

The quantities of manganese (Mn) and bromine (Br) to be present in the reaction system are preferably at least 0.02 gram-atom each, per 100 mols of acetic acid. The manganese compound and bromine or bromine compound can be added in up to 2 gram-atoms or more of manganese (Mn) or bromine (Br) per 100 mols of acetic acid in the reaction system. It should be noted, however, that the presence of a still greater quantity of bromine in the system is in no way detrimental to the reaction.

Furthermore, when the cobalt (Co) in the reaction system is relatively less, for example, 0.05 gram-atom or less, it is advantageous to increase the manganese (Mn), for example, to 0.1 gram-atom or more.

Practically satisfactory results can be obtained by using the cobalt compound, manganese compound, and bromine or bromine compound at such quantities that, when they are calculated as cobalt (Co), manganese (Mn) and bromine (Br), the total sum thereof does not exceed 2 gram-atoms per 100 mols of the acetic acid present in the reaction system. The cobalt (Co), and manganese (Mn) must never be present in the reaction system as free elements.

If the quantities of the catalyst calculated respectively as cobalt, manganese, and bromine, are such that the cobalt is less than 0.02 gram-atom or the manganese or bromine is less than 0.01 gram-atom, per 100 mols of acetic acid in the reaction system, the activity of the catalyst is reduced, and simultaneously the formation of objectionable side-products, (i.e., naphthalene ring cleavage products such as trimellitic acid,) increases.

Solvent

The process of this invention is conducted in an acetic acid solvent.

The acetic acid solvent preferably contains a minor amount of water, because the water promotes the solubility of the catalyst. The presence of excessive water, however, inhibits the process of the oxidation reaction. It must also be noted that water is formed as a by-product during the oxidation in accordance with the invention. Accordingly, it is preferred that the oxidation reaction is performed while controlling the water content of the acetic acid solvent to less than 20 percent by weight, particularly less than 15 percent by weight. Although the presence of water is not critical, it is particularly advantageous that the acetic acid solvent contains approximately 0.5 – 10 percent by weight of water. The optimum water content of the acetic acid solvent should also be determined in connection with the specific composition of the catalyst employed. In the foregoing, the "water content" is the value inclusive of the water of crystallization contained in the catalyst, the water formed as a by-product during the oxidation reaction, and other water incorporated into the solvent during the reaction.

Acetic acid is useful not only as a solvent of 2,6-dimethylnaphthalene, but also as that of the oxidation intermediates formed in accordance with the invention. Furthermore, the solvent presumably plays an important role in the formation of active catalyst, working in concert with the specified catalytic components.

It is important in the invention that the oxidation reaction is performed while controlling the amount of 2,6-dimethylnaphthalene so as not to exceed 1 mol, preferably 0.5 mol, per 100 mols of the acetic acid present in the reaction system.

When the oxidation is performed under conditions such that the 2,6-dimethylnaphthalene concentration exceeds 1 mol per 100 mols of acetic acid, the 6-formyl-2-naphthoic acid by-product of the 2,6-naphthalenedicarboxylic acid increases. Normally in oxidation reactions the contents of intermediate products such as 6-formyl-2-naphthoic acid can be decreased by taking sufficient reaction time. Quite differently, however, in the oxidation of 2,6-dimethylnaphthalene with molecular oxygen, 6-formyl-2-naphthoic acid once formed as the oxidation intermediate and precipitated with 2,6-naphthalenedicarboxylic acid is not substantially oxidized and converted to 2,6-naphthalenedicarboxylic acid, if the oxidation reaction time is extended or the reaction temperature is raised.

According to the invention, 2,6-naphthalenedicarboxylic acid of low 6-formyl-2-naphthoic acid by-product content can be obtained at surprisingly high yields, by maintaining the 2,6-dimethylnaphthalene concentration in the system at the above-specified low level.

Further research revealed that, surprisingly, the use of relatively large quantities of the specified catalytic components is effective to decrease the side-formation of ring-cleavage oxidation products of 2,6-dimethyl-naphthalene, such as trimellitic acid. For this reason it is advantageous to use the cobalt compound, manganese compound, and bromine or bromine compound, calculated respectively as cobalt (Co), manganese (Mn), and bromine (Br), in the amounts of at least 0.05 gram-atom of cobalt, and at least 0.02 gram-atom each of manganese and bromine, per 100 mols of acetic acid in the reaction system. Thus it is made possible to produce high quality 2,6-naphthalenedicarboxylic acid containing little naphthalene ring-cleavage oxidation product such as trimellitic acid, and impurities such as 6-formyl-2-naphthoic acid, at very high yields.

Also for securing the homogeneous contact of the reaction mixture with molecular oxygen and ease of operations such as the withdrawal of reaction product, the amount of the solvent in the reaction system, i.e., acetic acid or aqueous acetic acid solution, should be at least 2, preferably at least 3, and most preferably at least 4 parts by weight per part by weight of 2,6-naphthalenedicarboxylic acid.

Reaction temperature:

The reaction temperatures adopted for the subject process range from 160° to 250°C., preferably from 180° to 230°C.

When the reaction temperature is lower than 180°C., particularly below 160°C., the yield of object 2,6-naphthalenedicarboxylic acid drops. Particularly when it is below 160°C., the reaction mixture contains greater amounts of unreacted 2,6-dimethylnaphthalene and intermediate products such as 6-methyl-2-naphthoic acid.

When the reaction temperature is higher than 230°C., particularly above 250°C., side-formation of ring-cleavage products of naphthalene, such as trimellitic acid, increases, and not only is the 2,6-naphthalenedicarboxylic acid yield reduced and the product more heavily colored, but also the loss of acetic acid solvent through combustion is disadvantageously increased.

Molecular oxygen:

As the molecular oxygen, gaseous mixtures of oxygen with other gases inert to the reaction such as nitrogen, helium, argon, and the like, can be used as well as pure oxygen. Air is used in the oxidation reaction with advantage, since it is a most readily available molecular oxygen-containing gas.

The pressure of the pure molecular oxygen or molecular oxygen-containing gas (which are collectively referred to as molecular oxygen in the present specification) in the reaction system is not critical, so far as it is sufficient to maintain the reaction mixture, particularly the solvent, employed for the subject process, at liquid phase, at the already specified temperature range.

The reaction mixture according to the invention very readily absorbs molecular oxygen, and the oxidation reaction quite satisfactorily progresses even under a considerably low partial pressure of molecular oxygen.

The partial pressure of oxygen in the molecular oxygen-containing gas to be fed into the reaction system is normally 0.5 kg/cm² (absolute) or above, particularly at least 1 kg/cm² (absolute).

Reaction operations:

For batchwise practice of the subject process, 2,6-dimethyl-naphthalene, acetic acid, a cobalt compound, a manganese compound, and a bromine compound, are charged in a reactor, and heated to the reaction temperature. Then molecular oxygen or molecular oxygen-containing gas is blown into the system, and the reaction is performed for the time sufficient for the formation of 2,6-naphthalenedicarboxylic acid, under the pressure maintained at a predetermined level. Thereafter the 2,6-naphthalenedicarboxylic acid is isolated from the reaction mixture through conventional operations.

The subject process may be practiced semi-continuously or continuously.

Therefore, in the semi-continuous or continuous operation, 2,6-dimethylnaphthalene or a mixture thereof with the solvent is intermittently or continuously fed into the reaction system optionally with the catalytic components of the amounts suitable for maintaining the predetermined quantitative ratios of the components in the reaction system, while taking the necessary cares to maintain appropriate quantitative ratios of 2,6-dimethylnaphthalene and the catalytic components respectively to acetic acid, and the formed reaction mixture is withdrawn from the system either intermittently or continuously. Into the reaction system, molecular oxygen or molecular oxygen-containing gas is again either intermittently or continuously supplied. Thus the oxidation reaction of the invention is practiced while maintaining the reaction mixture at liquid phase in the reaction system.

The supplying of the starting material and of molecular oxygen or molecular oxygen-containing gas can be performed in any manner such as countercurrents or parallel currents.

Since 2,6-naphthalenedicarboxylic acid is hardly soluble even in hot acetic acid, it is easily separable from the reaction mixture which may be still at high temperatures, with any known separation technique such as filtration or centrifuging, and is thus readily recoverable free from the by-products soluble in acetic acid.

The 2,6-naphthalenedicarboxylic acid thus obtained is useful for various purposes either as it is, or after further purification.

According to the invention, the unreacted starting material, intermediate oxidation products, catalyst and the like, which remain in the mother liquor of the reaction from which the water and 2,6-naphthalenedicarboxylic acid have been removed, can be re-used by recycling the mother liquor into the oxidation system.

Hereinafter the process of this invention will be explained in further detail, with reference to working examples.

Examples 1 – 3 and Controls 1 – 2

A titanium pressure reactor equipped with a gas-inlet at the bottom, a gas-exhaust on the upper part and a stirrer, was charged with 2,6-dimethylnaphthalene of the quantities specified in Table 1, 5 mols (300 g) of glacial acetic acid, 0.004 mol (1.00 g) of cobalt acetate tetrahydrate, 0.004 mol (0.98 g) of manganese acetate tetrahydrate, and 0.005 mol (0.49 g) of ammonium bromide. The system was maintained at 200°C. under a pressure of 30 kg/cm²G, and compressed air was passed through at a rate of 1 liter/min. (approximately 25°C. at atmospheric pressure, as measured at the exit of the reactor) under stirring, for the periods specified also in Table 1.

After completion of the reaction, the reaction mixture was cooled and withdrawn, and the precipitate was separated by filtration. The precipitate was washed twice with 50 g each of hot acetic acid at 100°C., dried, and analyzed to give the results as shown in Table 1.

Separately the filtrate was analyzed and the content of unreacted 2,6-dimethylnaphthalene, 6-methyl-2-naphthoic acid, and trimellitic acid therein was determined. These results are also given in Table 1.

EXAMPLES 6 – 9 AND CONTROLS 5 – 6

A reactor similar to that employed in Example 1 was charged with 5 mols of glacial acetic acid, and 2,6-dimethylnaphthalene as well as the three catalytic components of the amounts specified for each run in Table 3 below. The reaction was performed under a Table 1

| Run No. | Feed Composition | | | | Reaction time (hrs.) | Conversion (%) | Analysis Results | | | |
|---|---|---|---|---|---|---|---|---|---|---|
| | Acetic Acid (mol) | Mol Number per 100 Mols of Acetic Acid | | | | | 2,6-Naphthalene-dicarboxylic acid yield (mol %) | 6-Formyl-2-naphthoic acid content* (wt. %) | 6-Methyl-2-Naphthoic Acid yield (mol %) | Trimellitic Acid yield (mol %) |
| | | 2-6-Dimethyl-naphthalene | Cobalt Acetate Tetra-hydrate | Manganese Acetate Tetra-hydrate | Ammonium Bromide | | | | | |
| Example 1 | 5 | 0.2 | 0.08 | 0.08 | 0.1 | 0.5 | >99.9 | 94.1 | 0.09 | 0.0 | 4.9 |
| Example 2 | 5 | 0.4 | 0.08 | 0.08 | 0.1 | 0.5 | >99.9 | 94.7 | 0.13 | 0.0 | 3.9 |
| Example 3 | 5 | 0.8 | 0.08 | 0.08 | 0.1 | 0.5 | >99.9 | 94.6 | 0.26 | 0.0 | 3.3 |
| Control 1 | 5 | 2.0 | 0.08 | 0.08 | 0.1 | 1.0 | >99.9 | 88.4 | 1.34 | 0.3 | 2.9 |
| Control 2 | 5 | 4.0 | 0.08 | 0.08 | 0.1 | 1.0 | >99.9 | 82.8 | 5.62 | 1.4 | 3.1 |

*"6-Formyl-2-Naphthoic Acid Content" refers to that in the 2,6-naphthalenedicarboxylic acid obtained, expressed by percent by weight. This statement applies to all of the following tables.

EXAMPLES 4 – 5 AND CONTROLS 3 – 4

A reactor similar to that employed in Example 1 was charged with 0.02 mol of 2,6-dimethylnaphthalene, 5 mols of glacial acetic acid, 0.004 mol of cobalt acetate tetrahydrate, 0.004 mol of manganese acetate tetrahydrate, and 0.005 mol of ammonium bromide. The system was reacted at the temperatures and pressures as specified in Table 2, for 30 minutes while air was blown thereinto at the same rate as specified in Example 1. After the reaction, the product was treated in the manner similar to Example 1, and analyzed with the results as shown in the following Table 2.

pressure of 40 kg/cm²G and at the temperatures specified in Table 3, while air was passed through the system at the same rate as employed in Example 1, for the time specified in Table 3.

After completion of the reaction, the reaction mixture was withdrawn and analyzed similarly to Example 1. The results were as shown in Table 3.

EXAMPLES 10 – 18

A reactor similar to that employed in Example 1 was charged with 5 mols of glacial acetic acid, 0.02 mol of 2,6-dimethylnaphthalene, and cobalt acetate tetrahy- Table 2

| Run No. | Feed Composition | | | | | Reaction Temp. (°C.) | Reaction Pressure (kg/cm²G) | Conversion (%) | Analysis Results | | | |
|---|---|---|---|---|---|---|---|---|---|---|---|---|
| | Acetic Acid (mol) | Mol Number per 100 Mols of Acetic Acid | | | | | | | 2,6-Naphthalenedicarboxylic Acid yield (mol %) | 6-Formyl-2-Naphthoic Acid Content (wt. %) | 6-Methyl-2-Naphthoic Acid yield (mol %) | Trimellitic Acid yield (mol %) |
| | | 2,6-Dimethyl-naphthalene | Cobalt Acetate Tetra-hydrate | Manganese Acetate Tetra-hydrate | Ammonium Bromide | | | | | | | |
| Control 3 | 5 | 0.4 | 0.08 | 0.08 | 0.1 | 140 | 30 | 98.0 | 76.2 | 5.22 | 2.3 | 8.2 |
| Ex. 4 | 5 | 0.4 | 0.08 | 0.08 | 0.1 | 180 | 30 | >99.9 | 93.2 | 0.84 | 0.1 | 4.1 |
| Ex. 1 | 5 | 0.4 | 0.08 | 0.08 | 0.1 | 200 | 30 | >99.9 | 94.7 | 0.13 | 0.0 | 3.9 |
| Ex. 5 | 5 | 0.4 | 0.08 | 0.08 | 0.1 | 220 | 30 | >99.9 | 91.0 | 0.09 | 0.0 | 3.8 |
| Control 4 | 5 | 0.4 | 0.08 | 0.08 | 0.1 | 260 | 40 | >99.9 | 84.8 | 0.10 | 0.0 | 10.7 |

Table 3

| Run No. | Acetic Acid (mol) | 2,6-Dimethyl-naphthalene | Cobalt Acetate Tetrahydrate | Manganese Acetate Tetrahydrate | Ammonium Bromide | Reaction Temp (°C.) | Reaction Time (hrs.) | Conversion (%) | 2,6-Naphthalene-dicarboxylic Acid yield (mol %) | 6-Formyl-2-Naphthoic Acid Content (wt. %) | 6-Methyl-2-Naphthoic Acid yield (mol %) | Trimellitic Acid yield (mol %) |
|---|---|---|---|---|---|---|---|---|---|---|---|---|
| Control 5 | 5 | 0.8 | 0.16 | 0.16 | 0.2 | 150 | 2.0 | 99.7 | 82.5 | 3.23 | 1.7 | 7.5 |
| Ex. 6 | 5 | 0.8 | 0.16 | 0.16 | 0.2 | 180 | 1.0 | >99.9 | 92.3 | 0.83 | 0.5 | 4.4 |
| Ex. 7 | 5 | 0.8 | 0.16 | 0.16 | 0.2 | 240 | 0.5 | >99.9 | 91.0 | 0.24 | 0.0 | 4.2 |
| Control 6 | 5 | 0.8 | 0.16 | 0.16 | 0.2 | 260 | 0.5 | >99.9 | 85.5 | 0.16 | 0.0 | 9.5 |
| Ex. 8 | 5 | 0.2 | 0.08 | 0.08 | 0.1 | 170 | 1.0 | >99.9 | 91.6 | 0.94 | 0.1 | 4.7 |
| Ex. 9 | 5 | 0.2 | 0.08 | 0.08 | 0.1 | 230 | 0.5 | >99.9 | 90.7 | 0.09 | 0.0 | 6.2 | drate, manganese acetate tetrahydrate, and ammonium bromide of the amounts each specified in Table 4 below. The reaction was performed at 200°C. and 30 kg/cm²G, while air was passed through the system at the same rate as specified for Example 1, for the time indicated in Table 4.

After the reaction of each run, the reaction mixture was withdrawn and analyzed similarly to Example 1. The results are also shown in Table 4.

A mixture composed of 10 parts of 2,6-dimethyl-naphthalene maintained at 70°C. (3.85 mols/100 mols of acetic acid), 100 parts of glacial acetic acid, 0.5 part of cobalt acetate tetrahydrate (0.12 mol/100 mols of acetic acid), 1 part of manganese acetate tetrahydrate (0.24 mol/100 mols of acetic acid) and 1 part of 47 percent hydrobromic acid (0.35 mol/100 mols of acetic acid) was fed into the reactor at a rate of 100 parts per hour, and the reaction was started.

Table 4

| Run No. Example | Acetic Acid (mol) | 2,6-Dimethyl-naphthalene | Cobalt Acetate Tetrahydrate | Manganese Acetate Tetrahydrate | Ammonium Bromide | Reaction Time (hrs.) | Conversion (%) | 2,6-Naphthalene-dicarboxylic Acid yield (mol %) | 6-Formyl-2-Naphthoic Acid Content (wt. %) | 6-Methyl-2-Naphthoic Acid yield (mol %) | Trimellitic Acid yield (mol %) |
|---|---|---|---|---|---|---|---|---|---|---|---|
| 1 | 5 | 0.4 | 0.08 | 0.08 | 0.1 | 0.5 | >99.9 | 94.7 | 0.13 | 0.0 | 3.9 |
| 10 | 5 | 0.4 | 0.08 | 0.08 | 0.05 | 1.0 | >99.9 | 91.2 | 0.38 | 0.0 | 5.8 |
| 11 | 5 | 0.4 | 0.08 | 0.08 | 0.02 | 1.0 | >99.9 | 90.2 | 0.78 | 0.2 | 7.3 |
| 12 | 5 | 0.4 | 0.08 | 0.08 | 0.01 | 2.0 | >99.9 | 89.3 | 0.98 | 0.3 | 8.8 |
| 13 | 5 | 0.4 | 0.08 | 0.05 | 0.1 | 1.0 | >99.9 | 91.8 | 0.21 | 0.1 | 6.6 |
| 14 | 5 | 0.4 | 0.08 | 0.02 | 0.1 | 1.0 | >99.9 | 90.4 | 0.29 | 0.1 | 7.8 |
| 15 | 5 | 0.4 | 0.08 | 0.01 | 0.1 | 2.0 | >99.9 | 88.0 | 0.36 | 0.1 | 8.6 |
| 16 | 5 | 0.4 | 0.05 | 0.16 | 0.1 | 1.0 | >99.9 | 90.1 | 0.40 | 0.2 | 3.6 |
| 17 | 5 | 0.4 | 0.02 | 0.16 | 0.1 | 2.0 | >99.9 | 86.8 | 0.86 | 0.2 | 3.8 |
| 18 | 5 | 0.4 | 0.02 | 0.32 | 0.1 | 2.0 | >99.9 | 90.6 | 0.63 | 0.2 | 3.7 |

EXAMPLE 19

A titanium pressure reactor equipped with an exhaust gas outlet on the upper part and a gas inlet, feed entrance and reaction mixture exit at the lower part, and also a stirrer, was charged with 100 parts of glacial acetic acid, 0.5 part of cobalt acetate tetrahydrate, 1.0 part of manganese acetate tetrahydrate, and 1.0 part of 47 percent hydrobromic acid. The gas exhaust on the reactor was connected to a reflux condenser. The pressure inside the reactor was maintained at 20 kg/cm²G, and the system was heated under stirring.

As soon as the temperature of the system reached the predetermined level of 200°C., condensed air was fed into the reactor at a rate of 50 parts per hour.

At the same time, the reactor content was withdrawn continuously from the reactor, at such a rate as to maintain a constant liquid level in the reactor.

Approximately 5 hours after the starting of the oxidation reaction, the composition of the system became substantially constant, and the reaction mixture composed of 0.01 – 0.05 wt. percent of 2,6-dimethylnaphthalene, 13.5 – 14.0 wt. percent of 2,6-naphthalenedicarboxylic acid, 0.01 – 0.03 wt. percent of 6-formyl-2-naphthoic acid, and 82 – 85 wt. percent of acetic acid, was withdrawn at a rate of 102 – 105 parts per hour. In the described reaction system, the 2,6-dimethylnaphthalene concentration was maintained at no higher than 0.03 mol per 100 mols of acetic acid.

The precipitate in the reaction mixture was separated by filtration, washed twice with ten times the weight thereof of hot acetic acid at 100°C., and dried. Thus, 2,6-naphthalenedicarboxylic acid containing 0.05 – 0.2 percent of 6-formyl-2-naphthoic acid was obtained at a yield of 94 – 96 mol percent of the supplied 2,6-dimethylnaphthalene.

Separately the filtrate was analyzed to determine the yields of 6-methyl-2-naphthoic acid and trimellitic acid, which were respectively 0.1 – 0.2 mol percent and 3 – 5 mol percent. Also the conversion of 2,6-dimethylnaphthalene was 99.4 – 99.9 percent.

EXAMPLE 20

This Example shows the oxidation reaction in which the starting 2,6-dimethylnaphthalene was divided into five equal portions and added to the reaction system.

First, a 0.02 mol portion from 0.1 mol of 2,6-dimethylnaphthalene was fed into a reactor similar to that employed in Example 1, together with 5 mols of glacial acetic acid, 0.004 mol of cobalt acetate tetrahydrate, 0.004 mol of manganese acetate tetrahydrate, and 0.005 mol of ammonium bromide. The reaction system was maintained at 200°C. and 30 kg/cm$^2$G, and air was passed therethrough for 30 minutes at the same rate as in Example 1. After the reaction the reactor content was cooled. Thus 0.02 mol of 2,6-dimethylnaphthalene per run was added to the reaction mixture in the reactor, and the reaction under the same reaction conditions as specified above was repeated five times. Upon thus oxidizing 0.1 mol of 2,6-dimethylnaphthalene, the reaction mixture was withdrawn and analyzed. The analysis results were as given in Table 5 below. The results of performing the oxidation similarly to the above, except that 0.1 mol of 2,6-dimethylnaphthalene was added to the system all at once, are also given in the same table as Control 1.

Table 5

|  | Example 20 | Control 1 |
|---|---|---|
| Conversion | >99.9 % | >99.9 % |
| 2,6-Naphthalene-dicarboxylic Acid yield | 94.8 mol % | 88.4 mol % |

Table 5.—Continued

|  | Example 20 | Control 1 |
|---|---|---|
| 6-Formyl-2-naphthoic Acid Content | 0.15 wt. % | 1.34 wt. % |
| 6-Methyl-2-naphthoic Acid yield | 0.0 mol % | 0.3 mol % |
| Trimellitic Acid Yield | 3.2 mol % | 2.9 mol % |

We claim:

1. A process for the preparation of 2,6-naphthalenedicarboxylic acid which comprises contacting 2,6-dimethylnaphthalene with molecular oxygen in acetic acid containing less than 20 percent by weight of water as the solvent and in the presence of an oxidation catalyst, wherein:
   A. not more than 1 mole of 2,6-dimethylnaphthalene is used per 100 mols of acetic acid;
   B. the contact is at a temperature of from 160° to 250°C.; and
   C. the oxidation catalyst consists essentially of
      1. cobalt compounds wherein at least 0.05 but not more than 2.0 grams atoms of cobalt per 100 mols of acetic acid are present,
      2. manganese compounds wherein at least 0.02 but not more than 2.0 gram atoms of manganese per 100 mols of acetic acid are present, and
      3. bromine or bromine compounds wherein at least 0.02 but not more than 2.0 gram atoms of bromine per 100 mols of acetic acid are present.

2. The process according to claim 1, in which the contact of 2,6-dimethylnaphthalene with molecular oxygen is effected at a temperature within the range of 180° – 230°C.

3. The process according to claim 1, in which the mol ratio of 2,6-dimethylnaphthalene to acetic acid in the reaction system is no greater than 0.5:100.

4. The process according to claim 1 in which the acetic acid contains from 0.5 to 10 percent water by weight.

5. The process of claim 1 with the proviso that the total sum of the catalyst components does not exceed 2.0 gram atoms per 100 mole of acetic acid.

* * * * *